US006606818B1

United States Patent
Christmas

(12) United States Patent
(10) Patent No.: US 6,606,818 B1
(45) Date of Patent: Aug. 19, 2003

(54) ENVIRONMENTAL INSECT CONTROL APPARATUS

(76) Inventor: John A. Christmas, 1703 Highway 252, Belton, SC (US) 29627

( * ) Notice: Subject to any disclaimer, the term of this patent is extended or adjusted under 35 U.S.C. 154(b) by 0 days.

(21) Appl. No.: 10/174,759

(22) Filed: Jun. 19, 2002

(51) Int. Cl.[7] ............................................... A01M 1/20
(52) U.S. Cl. .................................................... 43/132.1
(58) Field of Search ................................ 43/121, 132.1, 43/131; 47/40.5, 48.5; 119/61, 51.5

(56) References Cited

U.S. PATENT DOCUMENTS

| 134,444 | A | * | 12/1872 | Stell ............................. 43/121 |
| 137,336 | A | * | 4/1873 | Ames ........................... 43/121 |
| 280,291 | A | | 6/1883 | Bunnell |
| 464,535 | A | | 12/1891 | Walker |
| 673,155 | A | | 4/1901 | Blanchard |
| 884,928 | A | * | 4/1908 | Howard ......................... 43/121 |
| 885,536 | A | * | 4/1908 | Shimer ......................... 43/121 |
| 970,528 | A | * | 9/1910 | Miller .......................... 43/121 |
| 986,015 | A | * | 3/1911 | Lambert ....................... 43/121 |
| 1,002,919 | A | | 9/1911 | Knox |
| D56,552 | S | | 11/1920 | Cardinet |
| 1,424,596 | A | * | 8/1922 | Scrivner ....................... 43/121 |
| 1,471,986 | A | | 10/1923 | Voges |
| 1,515,094 | A | * | 11/1924 | Cumbie ........................ 43/121 |
| D117,114 | S | * | 10/1939 | Williams ................... D22/122 |
| 2,782,561 | A | * | 2/1957 | Smith .......................... 47/21.1 |
| 2,784,528 | A | * | 3/1957 | Rudenauer ................. 47/48.5 |
| 2,909,328 | A | * | 10/1959 | Babyak ....................... 239/268 |
| D229,074 | S | * | 11/1973 | Cuprak ....................... D30/130 |
| 4,640,044 | A | | 2/1987 | Varnon ....................... 43/132.1 |
| 4,698,934 | A | | 10/1987 | Gonzalez et al. ............. 43/121 |
| D329,681 | S | | 9/1992 | Demarest et al. .......... D22/122 |
| 5,212,905 | A | * | 5/1993 | Philoctete ................... 47/48.5 |
| 5,566,503 | A | * | 10/1996 | Nickson ........................ 47/33 |
| 5,746,021 | A | | 5/1998 | Green ......................... 43/131 |
| 6,026,609 | A | * | 2/2000 | Rawls ......................... 43/124 |
| 6,220,525 | B1 | * | 4/2001 | McSherdon ................. 239/271 |
| 6,367,194 | B1 | * | 4/2002 | Measday et al. ............. 47/24.1 |
| 6,418,663 | B1 | * | 7/2002 | Smith ............................ 47/79 |
| 6,520,114 | B1 | * | 2/2003 | Chun ........................... 119/61 |

\* cited by examiner

Primary Examiner—Charles T. Jordan
Assistant Examiner—Jordan M Lofdahl
(74) Attorney, Agent, or Firm—McNair Law Firm, P.A.

(57) ABSTRACT

An environmental insect control apparatus for forcing insects out of the ground for extermination by flooding the insect habitation. The apparatus includes a perimeter wall for being recessed into the ground surrounding an insect habitation, which forms an enclosed treatment area for the extermination of insects as the insects leave the habitation. A trough is formed between an interior ledge and an upper portion of the perimeter wall. Water circulates through the trough and around the interior side of the wall. The water cascades into the enclosed treatment area to form a pool of water that flood the ant mound. As the water cascades over the lip of the interior ledge, insects attempting to crawl up and out of the trap are swept back down. The insects are thereby forced out of the ground by the water and trapped by the recessed perimeter wall where they can be exterminated.

17 Claims, 3 Drawing Sheets

ENVIRONMENTAL INSECT CONTROL APPARATUS

FIELD OF THE INVENTION

The present invention relates to a trap for catching and exterminating burrowing types of insects, such as ants, in an environmentally friendly manner. More specifically, the present invention relates to a non-pesticide type insect trap adapted to enclose the ground surrounding an insect habitation to flood the enclosed area with water and force the insects out of the ground for extermination.

BACKGROUND OF THE INVENTION

Insect control is an area to which considerable attention has been devoted for many years. One type of insect in particular, ants from the genus Solenopsis, commonly known as fire ants, have aggressively colonized large areas of the southern United States and have developed into a serious pest control problem. Fire ants are responsible for causing substantial property damage and inflicting injury to people and animals.

Due to environmental concerns, the use of dangerous toxic chemicals as pesticides to control fire ants and other insects is no longer favored. Such toxic chemicals present an unacceptable health risk to homeowners with children and pets that may contact the dangerous chemicals. In an attempt to avoid extensive use of these toxic chemicals, a variety of insect traps have been developed to contain the infestation. As illustrated by U.S. Pat. Nos. 464,535; 280,291; 673,155; 1,002,919; and 1,471,986, many of these prior art traps have focused on designing a trap that fits around the ant mound or directly over the entrance of the ant mound in order to trap the ants as they emerge from the mound. A common feature to these inventions is the incorporation of a trough that may be filled with an insecticide or other fluid that keeps the ants from escaping. However, devices of this type have several disadvantages. First, the trap works in a passive manner, catching only those ants that crawl into the trap. The trap itself has no ability to force the ants out of the ground for extermination. The liquid placed in the trough is stationary and does not actively operate to prevent ants from crawling up the sides of the trough to escape. Only the design of the walls of the trap keeps the ants from escaping. Secondly, this type of trap require an extensive amount of time to work, during which time the ants may excavate a new entrance to the colony, avoiding the trap entirely. Additionally, due to the extended time periods the trap is in place, it may fill with rainwater and allow ants to escape by overflowing. Thirdly, some of these traps do not have the ability to trap flying ants and insects that emerge from the mound. Since the queen ant is capable of flight, the inability to capture this particular ant results in the queen being able to re-colonize another area outside the trap.

Accordingly, it is an object of the present invention to provide an environmental insect control apparatus that traps insects as they emerging from the insect habitation so they can be exterminated.

It is an object of the present invention to provide an environmental insect control apparatus that forces insects to leave the insect habitation and crawl to the surface by flooding the habitation with non-toxic fluid.

It is an object of the present invention to provide an environmental insect control apparatus that manipulated a continuous flow of fluid through the apparatus to restrict insects from escaping.

It is an object of the present invention to provide an environmental insect control apparatus that cover the entrance of the insect habitation with a pool of fluid to prevent winged insects from escaping.

SUMMARY OF THE INVENTION

The above objectives are accomplished according to the present invention by providing an environmental insect control apparatus used to force insects out of the ground for extermination by flooding the insect habitation with water. The apparatus includes a perimeter wall for being recessed into the ground surrounding an insect habitation, which forms an enclosed treatment area for the extermination of insects as the insects leave the habitation. An interior ledge is carried by an upper portion of the perimeter wall on an interior side of the wall and extends into the enclosed treatment area. A trough is thus formed between the interior ledge and the upper portion of the perimeter wall. The trough is adapted for receiving a supply of water, which circulates through the trough and cascades over a lip of the interior ledge into the enclosed treatment area to form a pool of water. As the water cascades over the lip of the interior ledge, insects attempting to crawl up and out of the trap are swept back down. As a result, the insects are trapped in the enclosed treatment area and the recessed perimeter wall restricts the passage of insects and water underneath the perimeter wall and floods the insect habitation with water. As the water cascades into the enclosed treatment area, a pool of water will form over the top of the mound to prevent any winged insects from escaping. The water then forces the insects out of the ground and up into enclosed treatment area for extermination by any number of chemical and non-chemical extermination means.

In a further advantageous embodiment, the insect control apparatus includes a serrated bottom edge to the perimeter wall for cutting into the ground surrounding the insect habitation to recess the wall and restrict the passage of insects and water underneath the wall. Preferably, the interior ledge is disposed below a top edge of the perimeter wall so that water is prevented from spilling over the perimeter wall and possibly allowing insects to escape. Additionally, the apparatus preferably includes a handle carried on an exterior side of the perimeter wall to provide leverage in recessing the perimeter wall and cutting through the ground with the serrated bottom edge. Using the handle, a person can shift the apparatus back and forth in a cutting motion to dig a channel in the ground in which to set the apparatus and prevent water and insects from running out underneath the apparatus.

In a further advantageous embodiment, the insect control apparatus includes a hose connector carried by the perimeter wall for introducing a continuous supply of water to the apparatus. Preferably, the hose connector includes a water chute for directing the passage of water from the hose into the trough so that the water is properly circulated around the perimeter wall before cascading into the enclosed treatment, thereby sweeping any insects off the perimeter wall and trough.

Accordingly, an environmentally friendly insect control apparatus is provided for the extermination of burrowing insects without the extensive use of chemical pesticides.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF A PREFERRED EMBODIMENTS

Figure 1:
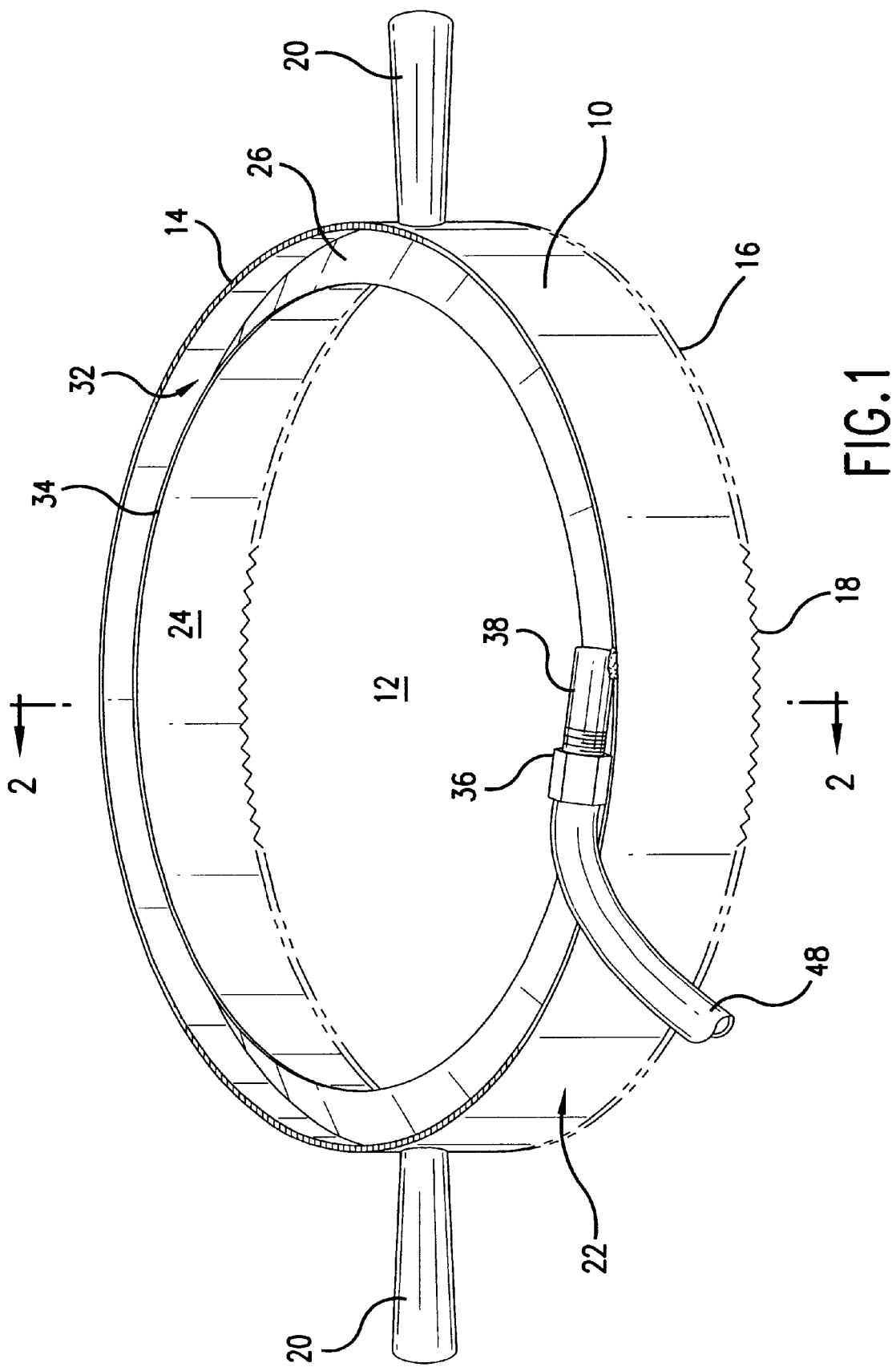
FIG. 1 is a perspective view of the environmental insect control apparatus according to the invention.

Referring now to the drawings, the invention will be described in more detail.

Referring to FIG. 1, a perspective view is shown of an insect control apparatus that uses water to treat insect infestation in an environmentally safe manner. The apparatus is designed to enclose the area surrounding an ant mound, or other burrowing insect habitation, and force the insects out of the ground for extermination by flooding the enclosed area with water. The apparatus uses a continuous flow of water to maintain a pool of water overtop the ant mound as the water seeps into the ground. As the water works its way into the insect habitation, the insects instinctively crawl out of the ground. When the insects arrive at the surface of the enclosed area, they may float to the top of the pool of water where they can then be exterminated by any number of means, or may simply suffocate underneath the water. Advantageously, as the water forms a pool over the insect habitation, winged insects are prevented from flying away and starting a new colony. Once the water penetrates the ant mound, portions of the mound will collapse and trap many of the ants underground, thereby actively treating the ant mound and reducing the likelihood that the mound will be rebuilt.

Figure 3:
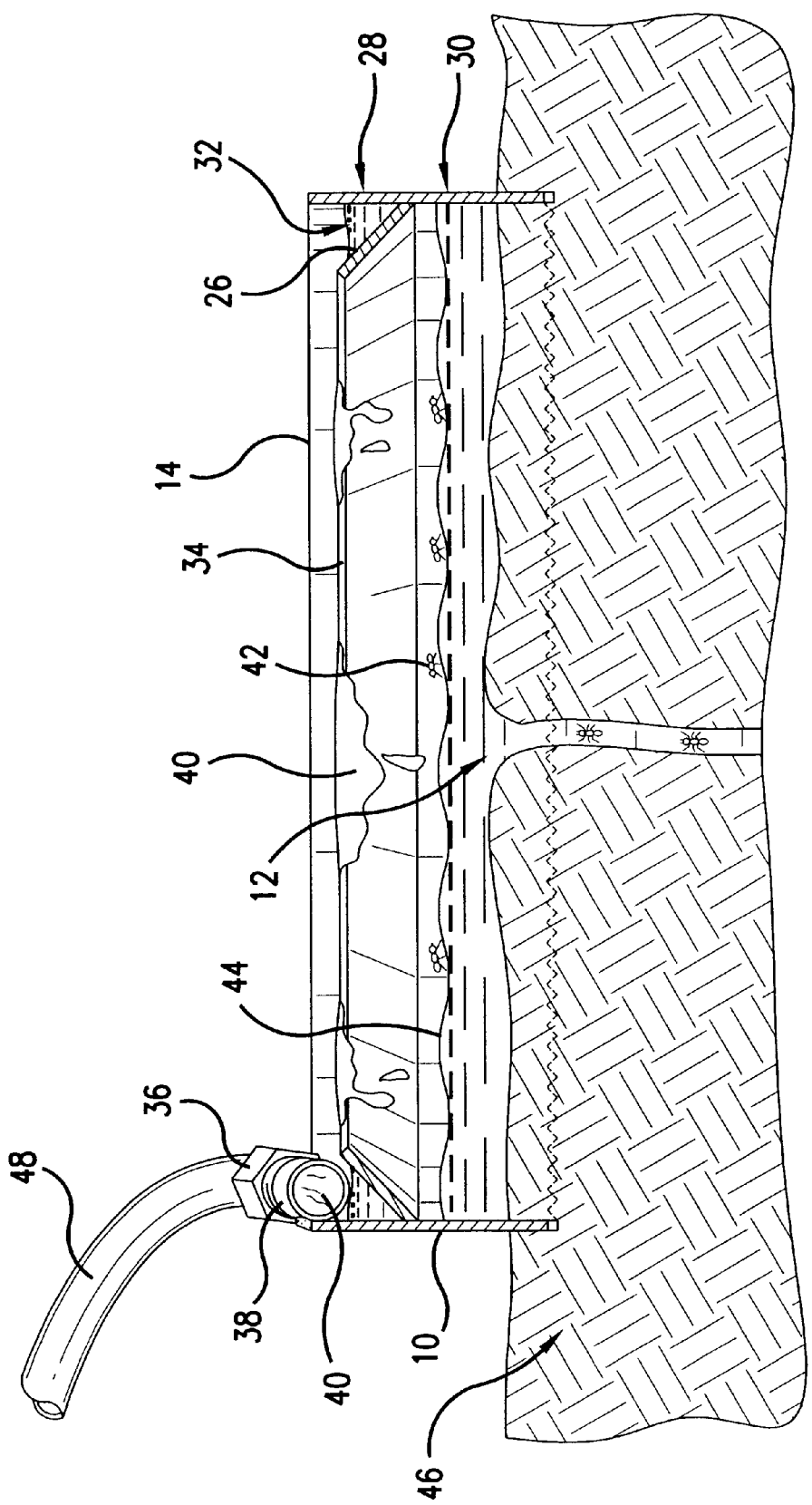
FIG. 3 is a cross-section of the environmental insect control apparatus recessed into the ground and showing the flow of water through the apparatus according to the invention.

As shown in FIG. 1, the apparatus includes a perimeter wall 10. In use as shown in FIG. 3, the perimeter wall is recessed into the ground surrounding an insect habitation. By recessing the perimeter wall, the passage of ants and water underneath the wall is restricted and the apparatus is set in position to prevent it from dislodging or shifting during use. When the wall is recessed, it forms an enclosed treatment area, designated generally as 12, to trap insects leaving the habitation for extermination. The enclosed treatment area includes the area inside the perimeter wall both above and below ground level that will be flooded with water when the wall is recessed.

Many ant mounds and insect habitations extend up from the ground several inches, or even several feet, as the earth is excavated from underneath the mound and pushed up by the insects. In order to treat such mounds, the apparatus must be constructed with a sufficient height so as to be able to maintain a level of water in the enclosed treatment area above the top of the mound being treated. For example, in the preferred embodiment, the apparatus would be constructed to have a perimeter wall with a diameter of approximately 32 inches and a height of approximately 12 inches. These dimensions would be sufficient to treat the majority of insect habitation mounds created. Fire ants, however, often produce larger mounds of over one foot in height. In order to treat these mounds, the apparatus is constructed with a diameter of approximately 42 inches and a height of approximately 24 inches. These dimensions are for illustrated purposes of a preferred embodiment and specific to the examples discussed above. It is to be understood that varying the diameter and height of the apparatus to accommodate for various sizes of insect habitations is within the spirit and scope of this invention.

In the preferred embodiment shown in FIG. 1, the perimeter wall is defined by a top edge 14 and a bottom edge 16. Preferably, bottom edge 16 is adapted to cut through the ground and recess the perimeter wall to restrict the passage of water and insects underneath the perimeter wall. Advantageously, bottom edge 16 may be constructed to include a plurality of serrated teeth 18, which allow the apparatus to cut through the soil and vegetation surrounding the ant mound and firmly set the apparatus in the ground. In the preferred embodiment, handles 20 are also attached to an exterior side, designated generally as 22, of perimeter wall 10 to provide a point of leverage for a user in setting the apparatus in the ground. By using the handles, a person can twist the apparatus in a back and forth motion to cause serrated teeth 18 to cut into the ground surrounding the ant mound. Alternatively, bottom edge 16 can be constructed with a sharp bottom edge to allow the user to simply push the apparatus straight into the ground using handles 20.

Figure 2:
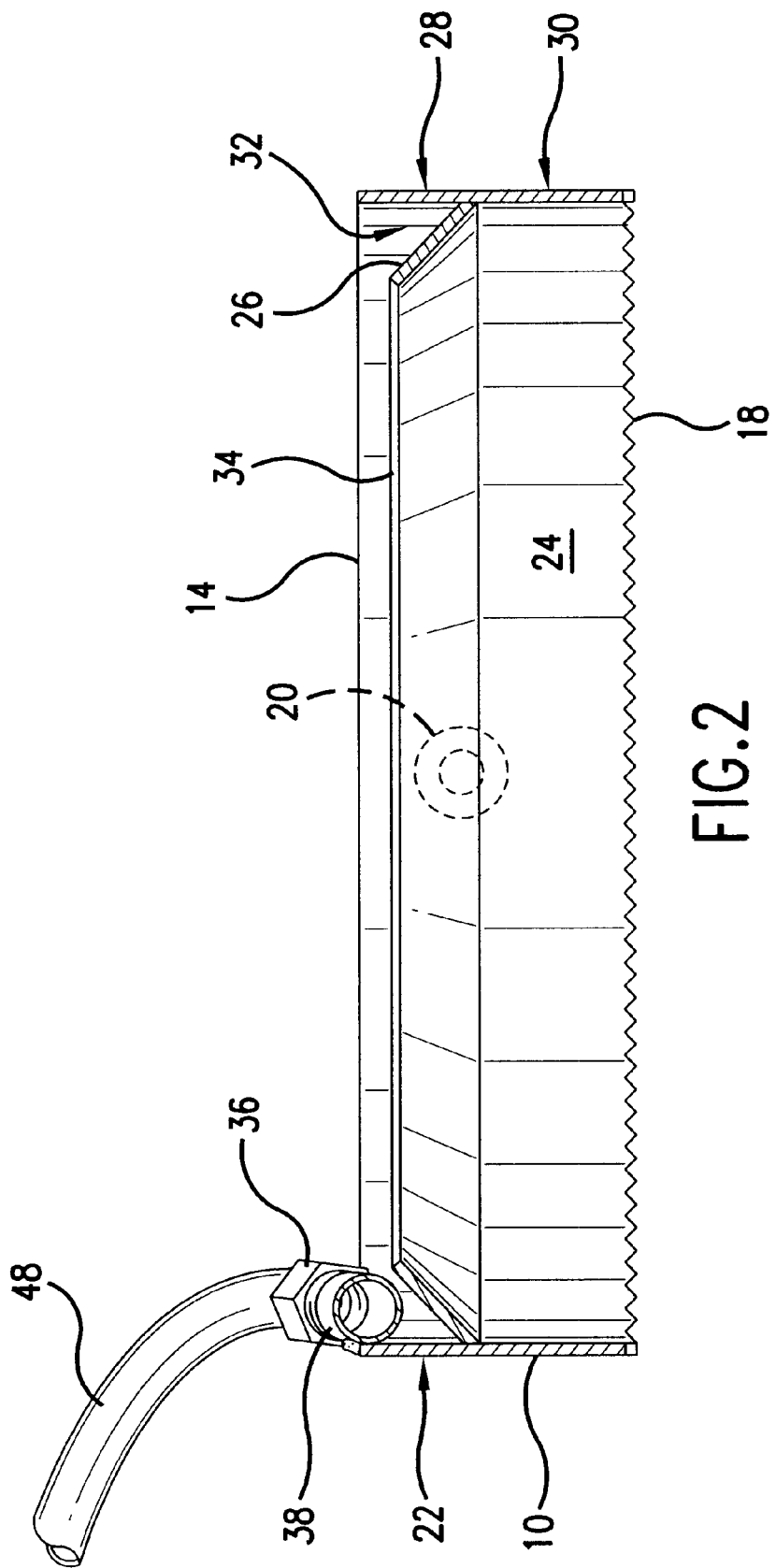
FIG. 2 is a cross-section of the environmental insect control apparatus according to the invention.

Referring to FIG. 2, the perimeter wall is defined to include an area designated generally as an upper portion 28 and a lower portion 30. As best illustrated in FIG. 3, in the preferred embodiment, upper portion 28 is generally designated as the portion of perimeter wall 10 above pool of water 44 created by the cascade of water into the enclosed treatment area. Lower portion 30 is generally designates as the portion of perimeter wall 10 recessed into ground 46 and submerged by pool of water 44. Referring to FIG. 2, an interior ledge 26 is affixed to upper portion 28 on an interior side 24 of perimeter wall 10. Interior ledge 26 extends into the enclosed treatment area in an upward angled direction and runs along the entire interior side of the perimeter wall. Preferably, interior ledge 26 is attached to perimeter wall 10 at least 2" below top edge 14. This creates a trough, designated generally as 32, between upper portion 28 of interior side 24 of perimeter wall 10 that channels water around the entire interior circumference of the perimeter wall. Referring to FIG. 3, as water 40 fills trough 32, it cascades over lip 34 and into enclosed treatment area 12. The running water restricts the ability of insects 42 to climb up the perimeter wall. Additionally, the upward angle of the interior ledge forces the insects to fall back into the enclosed treatment area when trying to get over lip 34. Even if an ant or other such insect were able to get over lip 34, the insect would by swept by the moving water in the trough back over the lip and into the enclosed treatment area. Other similar means for channeling the water around the interior side of the perimeter wall may also be used. For example, such as a V-shaped trough that may be affixed directly to the perimeter wall. It is understood that the above embodiments are shown to illustrate to those skilled in the art the details of this invention, but the scope of the present invention is not to be limited to merely these embodiments.

Referring to FIG. 1, in order to supply the water for the apparatus, a hose connector 36 is carried by top edge 14 of perimeter wall 10. Preferably the hose connector is capable of receiving a standard size garden hose 48 for providing the water necessary for treating the ant mound. A water delivery chute 38 is also provided for directing the passage of water properly into the trough so that the water is circulated through the trough and around the entire interior side of the perimeter wall to sweep any ants attempting to escape back into the enclosed treatment area for extermination.

As best depicted in FIGS. 2 and 3, lip 34 of interior ledge 26 is disposed below top edge 14 of perimeter wall 10. This is necessary because as the water in the trough rises, it will cascade over lip 34, down interior side 24 of perimeter wall 10, and flood the enclosed treatment area. If lip 34 were level with top edge 14, the water could spill outside of the enclosed treatment area, possibly taking with it ants that managed to climb up the perimeter wall. Additionally, as the apparatus may not be placed on level ground, placing the lip of interior ledge 26 below top edge 14 provides some adjustability in positioning the apparatus with a slight tilt without having water spill over top edge 14. In the preferred embodiment, lip 34 of interior ledge 26 is at least ½" below top edge 14 so that when ants attempt to crawl up the sides of the perimeter all, the water cascading over lip 34 will force the ants back into the enclosed treatment area, instead of over exterior side 22 of the perimeter wall.

While a preferred embodiment of the invention has been described using specific terms, such description is for illustrative purposes only, and it is to be understood that changes and variations may be made without departing from the spirit or scope of the following claims.

What is claimed is:

1. An environmental insect control apparatus used to force insects out of the ground for extermination comprising:
   a perimeter wall for being recessed into the ground surrounding an insect habitation;
   said perimeter wall forming an enclosed treatment area when recessed to trap insects leaving the habitation for extermination;
   a trough carried by an upper portion of said perimeter wall on an interior side of said perimeter wall;
   said trough vertically spaced above the ground and extending continuously around said interior side of said perimeter wall; and,
   said trough adapted for receiving a supply of water and circulating said supply of water in said trough around said interior side of said perimeter wall above said enclosed treatment area so that the trough fills with circulating water and overflows causing the circulating water to cascade out of said trough and into said enclosed treatment area to form a pool of water beneath said trough and prevent insects from climbing the perimeter wall to escape;
   whereby said perimeter wall restricts the passage of insects and water underneath said perimeter wall when recessed and floods the insect habitation with water to force the insects out of the ground to the surface of the enclosed treatment area for extermination.

2. The apparatus of claim 1 wherein said trough includes an interior ledge carried by said upper portion of said perimeter wall on said interior side of said wall; and said interior ledge extending at an inclined angle upward from said interior side of said perimeter wall and into the enclosed treatment area to form said trough between said interior ledge and said upper portion of said perimeter wall so as to be vertically spaced above the ground.

3. The apparatus of claim 2 wherein a lip of said interior ledge is disposed below a top edge of said perimeter wall and vertically spaced above the ground so that the water cascades over said lip and into the enclosed treatment area and is prevented from spilling over an exterior side of said perimeter wall.

4. The apparatus of claim 1 wherein said perimeter wall is constructed and arranged with said interior side being an unbroken seamless continuous wall including a serrated bottom edge running continuously around the bottom edge of said perimeter wall for cutting into the ground surrounding the insect habitation to recess the wall into the ground to and restrict the passage of insects and water underneath said wall.

5. The apparatus of claim 1 including a handle carried on an exterior side of said perimeter wall to provide a point of leverage for a user in recessing said perimeter wall and cutting through the ground with said serrated bottom edge.

6. The apparatus of claim 1 including a hose connector carried by said perimeter wall; said hose connector including a water delivery chute disposed above said trough extending along said interior side of said perimeter wall and being angled downwardly from said hose connector towards said trough for directing the passage of water from said hose connector into said trough so that the water is circulated through said trough around said interior side of the perimeter wall.

7. An environmental insect control apparatus used to force ants out of an ant mound for extermination comprising:
   wall means for enclosing an area surrounding an ant mound to form an enclosed treatment area;
   cutting means carried by a bottom edge of said wall means for cutting into the ground to recess the wall means around the ant mound;
   a fluid supply means for supplying fluid to the enclosed treatment area; and
   flow control means operatively associated with said wall means being vertically spaced above the ground and extending continuously around an interior side of said wall means for receiving said fluid from said fluid supply means and causing the fluid to circulate around said interior side of said wall means and cascade from said flow control means into the enclosed treatment area to flood the ant mound with fluid and prevent ants from exiting over the wall means.

8. The apparatus of claim 7 wherein said wall means includes a circular perimeter wall having a diameter of approximately 32" and a height of approximately 12".

9. The apparatus of claim 8 wherein said cutting means includes a serrated bottom edge running continuously around the bottom edge of said circular perimeter wall which provides a plurality of teeth for cutting into the ground to recess the circular perimeter wall around the ant mound.

10. The apparatus of claim 7 wherein said fluid supply means includes a hose connector carried by said wall means for receiving a supply of water from a hose; said hose connector including a water delivery chute disposed above said flow control means extending along said interior side of said wall means and being angled downwardly from said hose connector towards said flow control means for directing the passage of water from said hose connector into said flow control means so that the water is caused to circulate around said interior side of said wall means and cascade into said enclosed treatment area.

11. The apparatus of claim 10 wherein said flow control means includes a trough carried by an upper portion of said wall means being vertically spaced above the ground on said interior side of the wall means when said wall means is recessed into the ground; said trough including a lip disposed below a top edge of said wall means allowing water to cascade out of said trough over said lip and into the enclosed treatment area to prevent water from spilling over an exterior side of said wall means.

12. An environmentally friendly method for controlling burrowing insect infestation by forcing the insects out of the ground for extermination comprising the steps of:
   enclosing the area surrounding an insect habitation with a solid perimeter wall having an interior water trough carried around an upper portion of an interior side of said wall vertically spaced above the ground and below a top edge of the wall to create an enclosed treatment area;

recessing the perimeter wall into the ground using a bottom edge of said wall adapted to cut through the ground and recess the wall in order to restrict the passage of water and insects underneath the perimeter wall;

providing a water supply for treatment of the insect habitation by flooding the insect habitation with water;

connecting said water supply to the perimeter wall so that the water flows into said trough and circulates around the interior side of the perimeter wall in said trough and cascades out of said trough into the enclosed treatment area to prevent insects from climbing up the sides of the perimeter wall to escape extermination;

flooding the enclosed treatment area with water sufficient to maintain a pool of water over the insect habitation to force the insects in the ground to come to the surface so that the insects may be exterminated.

13. The method of claim 12 further comprising the step of providing a serrated bottom edge to the perimeter wall to cut through the ground and recess the wall.

14. The method of claim 13 further comprising the step of shifting the perimeter wall in a back and forth motion to cause said serrated bottom edge to cut a channel into which the perimeter wall can be recessed.

15. The method of claim 14 further comprising the step of providing at least one handle affixed to said perimeter wall to create a point of leverage for a user to better cause said back and forth motion.

16. The method of claim 12 further comprising the step of providing a hose connector affixed to said perimeter wall for receiving a hose to deliver said water supply.

17. The method of claim 16 further comprising the step of providing a water delivery chute affixed to said hose connector for directing the flow of water into said trough and causing said water to circulate through said trough so that insects which climb up said perimeter wall are swept into the circulating water and caused to cascade back into said enclosed treatment area.

* * * * *